US009407664B1

(12) United States Patent
Banerjee (10) Patent No.: US 9,407,664 B1
(45) Date of Patent: Aug. 2, 2016

(54) SYSTEMS AND METHODS FOR ENFORCING ENTERPRISE DATA ACCESS CONTROL POLICIES IN CLOUD COMPUTING ENVIRONMENTS

(71) Applicant: Symantec Corporation, Mountain View, CA (US)

(72) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 144 days.

(21) Appl. No.: 14/138,136

(22) Filed: Dec. 23, 2013

(51) Int. Cl.
*H04L 29/06* (2006.01)

(52) U.S. Cl.
CPC ...................... *H04L 63/20* (2013.01)

(58) Field of Classification Search
CPC ... H04L 63/20; H04L 63/102; H04L 63/0227; G06F 21/6218; G06F 21/604
USPC ............................................................ 726/1
See application file for complete search history.

(56) References Cited

U.S. PATENT DOCUMENTS

| | | | | |
|---|---|---|---|---|
| 7,788,713 B2* | 8/2010 | Grobman | ................ | G06F 21/53 718/1 |
| 8,364,984 B2* | 1/2013 | Jeffries et al. | ................. | 713/193 |
| 8,712,839 B2* | 4/2014 | Steinert | .................. | G06Q 30/02 705/14.1 |
| 8,898,806 B1* | 11/2014 | Manmohan | ...................... | 726/30 |
| 9,065,642 B2* | 6/2015 | Zaverucha | ............ | H04L 9/3263 |
| 2003/0051164 A1* | 3/2003 | Patton | ...................... | G06F 21/33 726/4 |
| 2003/0059096 A1* | 3/2003 | Dekel | .................. | H04N 1/3873 382/131 |
| 2008/0059474 A1* | 3/2008 | Lim | .................................. | 707/9 |
| 2009/0007236 A1* | 1/2009 | Aoki | .................. | G06Q 30/0281 726/3 |
| 2010/0317323 A1* | 12/2010 | Facemire | ............ | H04L 63/0492 455/411 |
| 2011/0214182 A1* | 9/2011 | Adams | ..................... | G06F 21/00 726/23 |
| 2013/0061306 A1* | 3/2013 | Sinn | .................................. | 726/7 |
| 2013/0227659 A1* | 8/2013 | Raleigh | ............................ | 726/5 |
| 2013/0291079 A1* | 10/2013 | Lowe | ..................... | G06F 21/00 726/7 |
| 2015/0261776 A1* | 9/2015 | Attarde | ............. | G06F 17/30156 707/664 |

OTHER PUBLICATIONS

Deb Banerjee; Systems and Methods for Protecting Platform-As-A-Service Platforms; U.S. Appl. No. 13/420,569, filed Mar. 14, 2012.
Deb Banerjee; Systems and Methods for Enforcing Secure Network Segmentation for Sensitive Workloads; U.S. Appl. No. 13/945,373, filed Jul. 18, 2013.

* cited by examiner

*Primary Examiner* — Harunur Rashid
*Assistant Examiner* — Sakinah Taylor
(74) *Attorney, Agent, or Firm* — ALG Intellectual Property, LLC (57) ABSTRACT

A computer-implemented method for enforcing enterprise data access control policies in cloud computing environments may include (1) intercepting, at a proxy, an attempt to configure a computing instance on a cloud computing platform with a permission that would provide the computing instance with access to secured data on the cloud computing platform, (2) identifying a user within an enterprise that initiated the attempt to configure the computing instance with the permission, (3) determining, based on a data access control policy for the enterprise, that the user is not entitled to access the secured data, and (4) blocking the attempt to configure the computing instance with the permission based on determining that the user is not entitled to access the secured data. Various other methods, systems, and computer-readable media are also disclosed.

18 Claims, 6 Drawing Sheets

SYSTEMS AND METHODS FOR ENFORCING ENTERPRISE DATA ACCESS CONTROL POLICIES IN CLOUD COMPUTING ENVIRONMENTS

BACKGROUND

In the digital age, organizations increasingly depend on computing resources to manage data and to provide internal and external services. In order to manage increasingly complex information technology infrastructures, some organizations may use platform-as-a-service platforms for deploying applications. The platform-as-a-service model may allow organizations to bring applications online without acquiring, configuring, or maintaining the underlying hardware and software stack.

Delegating the maintenance of a computing platform to a third-party may save an organization time, may save the organization money, and/or may increase the flexibility with which the organization may select resources for and allocate resources to applications. Unfortunately, by outsourcing computing platforms, the same organization may reduce its control over the computing platforms, preventing the organization from applying security policies and other compliance policies not provided for by the platform-as-a-service provider.

Some traditional platform-as-a-service platforms may allow administrators to launch computing instances with specified roles that are associated with permissions to access specified data sets. For example, an administrator may launch a computing instance that is granted credentials to access a cloud-stored database of credit card data but is not granted credentials to access a cloud-stored database of medical data (or vice versa). However, some organizations may employ multiple administrators with separate organizational roles and, therefore, responsibility over differing datasets. Unfortunately, traditional platform-as-a-service platforms may allow all administrators in an organization to launch a computing instance with any or all available permissions and/or allow administrators to access data outside the scope of their responsibilities.

Accordingly, the instant disclosure identifies and addresses a need for additional and improved systems and methods for enforcing enterprise data access control policies in cloud computing environments.

SUMMARY

As will be described in greater detail below, the instant disclosure generally relates to systems and methods for enforcing enterprise data access control policies in cloud computing environments by intercepting and inspecting management traffic into a cloud computing platform at a network proxy. These systems and methods may determine whether to allow or block attempts by users within an enterprise to configure computing instances on the cloud computing platform by examining permissions to be granted to the computing instances, which users are attempting to provision the computing instances with the permissions, and the roles of the users in the enterprise.

In one example, a computer-implemented method for enforcing enterprise data access control policies in cloud computing environments may include (1) intercepting, at a proxy, an attempt to configure a computing instance on a cloud computing platform with a permission that would provide the computing instance with access to secured data on the cloud computing platform, (2) identifying a user within an enterprise that initiated the attempt to configure the computing instance with the permission, (3) determining, based on a data access control policy for the enterprise, that the user is not entitled to access the secured data, and (4) blocking the attempt to configure the computing instance with the permission based on determining that the user is not entitled to access the secured data.

In one embodiment, the computer-implemented method may further include retrieving, at the proxy, the data access control policy from the enterprise. In some examples, identifying the user within the enterprise that initiated the attempt to configure the computing instance with the permission may include extracting, at the proxy, an identifier of the user from the attempt to configure the computing instance. In some examples, determining that the user is not entitled to access the secured data may include extracting, at the proxy, an identifier of the permission from the attempt to configure the computing instance.

In one embodiment, the computer-implemented method may further include (1) identifying, subsequent to blocking the attempt, an additional user within the enterprise that is entitled to access the secured data, (2) initiating a request to the additional user to approve the attempt to configure the computing instance with the permission that would provide the computing instance with access to secured data on the cloud computing platform, (3) receiving, in response to the request, approval from the additional user to configure the computing instance with the permission, and (4) forwarding the attempt to configure the computing instance to the cloud computing platform.

In one embodiment, the user may be entitled to configure the computing instance on the cloud computing platform without the permission. In addition, the computer-implemented method may further include (1) intercepting, at the proxy, an additional attempt to configure an additional computing instance on the cloud computing platform with the permission, (2) identifying an additional user within the enterprise that initiated the additional attempt to configure the additional computing instance, (3) determining, based on the data access control policy for the enterprise, that the additional user is entitled to access the secured data, and (4) allowing the attempt to configure the additional computing instance with the permission based on determining that the additional user is entitled to access the secured data.

In one embodiment, determining, based on the data access control policy for the enterprise, that the user is not entitled to access the secured data may include (1) identifying a cloud-side role that is defined on the cloud computing platform as having access to the permission, (2) identifying an enterprise-side role pertaining to the user, (3) identifying a role map that maps enterprise-side roles to cloud-side roles, and (4) determining, based on the role map, that the enterprise-side role is not mapped to the cloud-side role.

In one embodiment, a system for implementing the above-described method may include (1) an interception module, stored in memory, that intercepts, at a proxy, an attempt to configure a computing instance on a cloud computing platform with a permission that would provide the computing instance with access to secured data on the cloud computing platform, (2) an identification module, stored in memory, that identifies a user within an enterprise that initiated the attempt to configure the computing instance with the permission, (3) a determination module, stored in memory, that determines, based on a data access control policy for the enterprise, that the user is not entitled to access the secured data, (4) a blocking module, stored in memory, that blocks the attempt to configure the computing instance with the permission based on determining that the user is not entitled to access the secured data, and (5) at least one processor configured to execute the interception module, the identification module, the determination module, and the blocking module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) intercept, at a proxy, an attempt to configure a computing instance on a cloud computing platform with a permission that would provide the computing instance with access to secured data on the cloud computing platform, (2) identify a user within an enterprise that initiated the attempt to configure the computing instance with the permission, (3) determine, based on a data access control policy for the enterprise, that the user is not entitled to access the secured data, and (4) block the attempt to configure the computing instance with the permission based on determining that the user is not entitled to access the secured data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for enforcing enterprise data access control policies in cloud computing environments. As will be explained in greater detail below, by determining whether to allow or block attempts by users within an enterprise to configure computing instances on the cloud computing platform by examining permissions to be granted to the computing instances, which users are attempting to provision the computing instances with the permissions, and the roles of the users in the enterprise, the systems and methods described herein may allow an enterprise to ensure that administrators do not access and/or control cloud-stored data outside the scope of their roles in the enterprise. Furthermore, by intercepting and inspecting management traffic into a cloud computing platform at a network proxy, these systems and methods may enable an enterprise to achieve the above with a variety of cloud computing platforms and without requiring changes to the cloud computing platforms (which, e.g., may be out of the control of an organization wishing to manage permissions in a cloud computing context).

Figure 1:
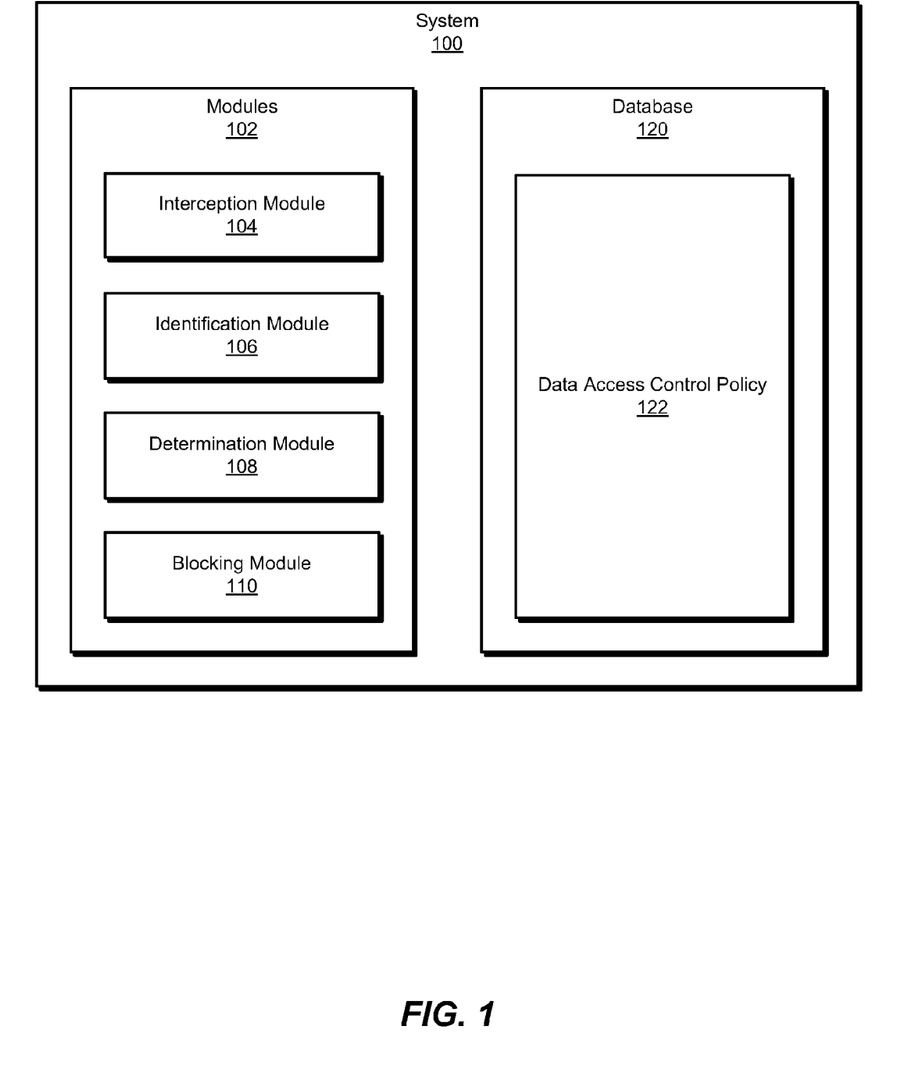
FIG. 1 is a block diagram of an exemplary system for enforcing enterprise data access control policies in cloud computing environments.
Figure 2:
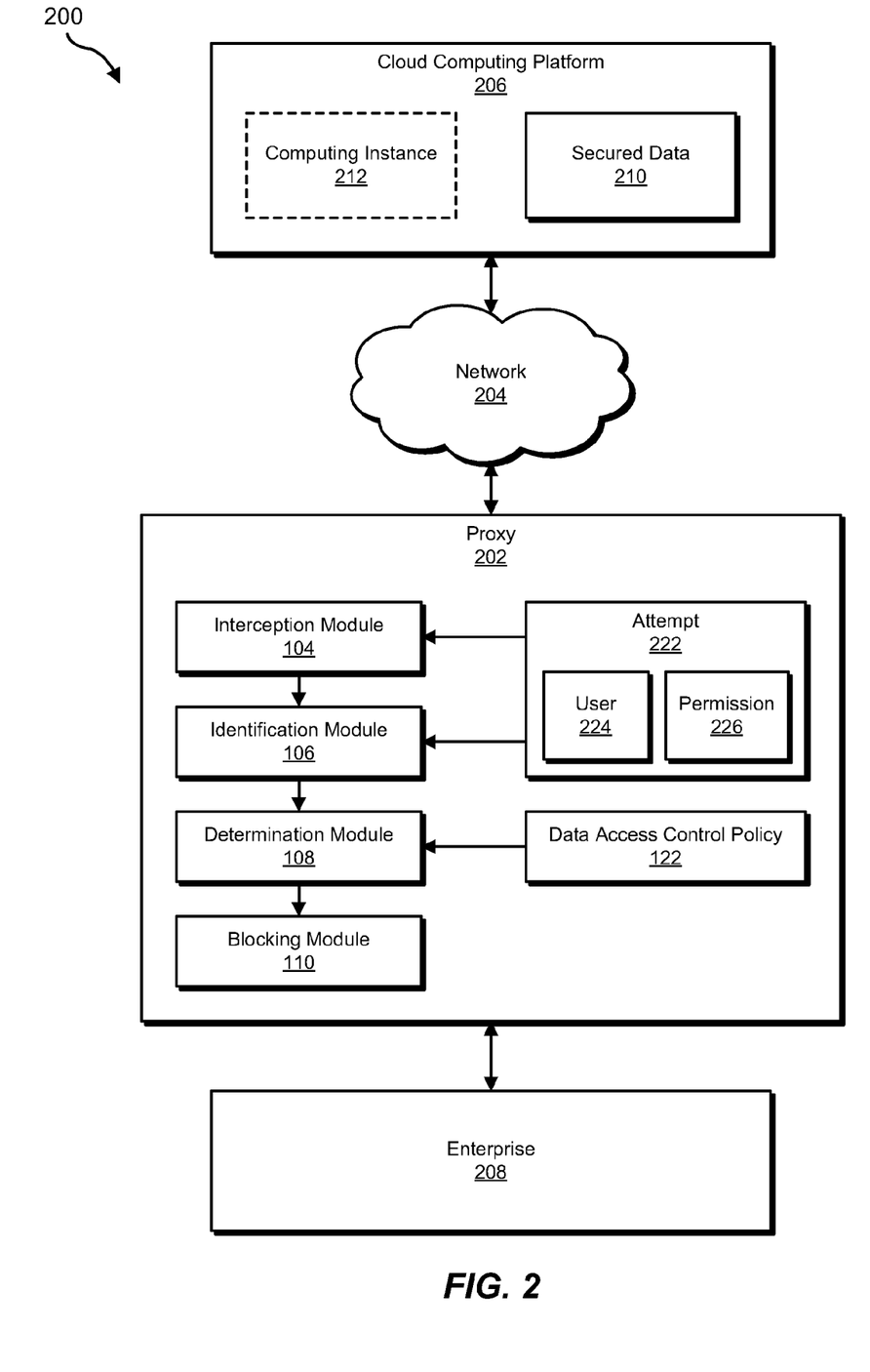
FIG. 2 is a block diagram of an additional exemplary system for enforcing enterprise data access control policies in cloud computing environments.
Figure 3:
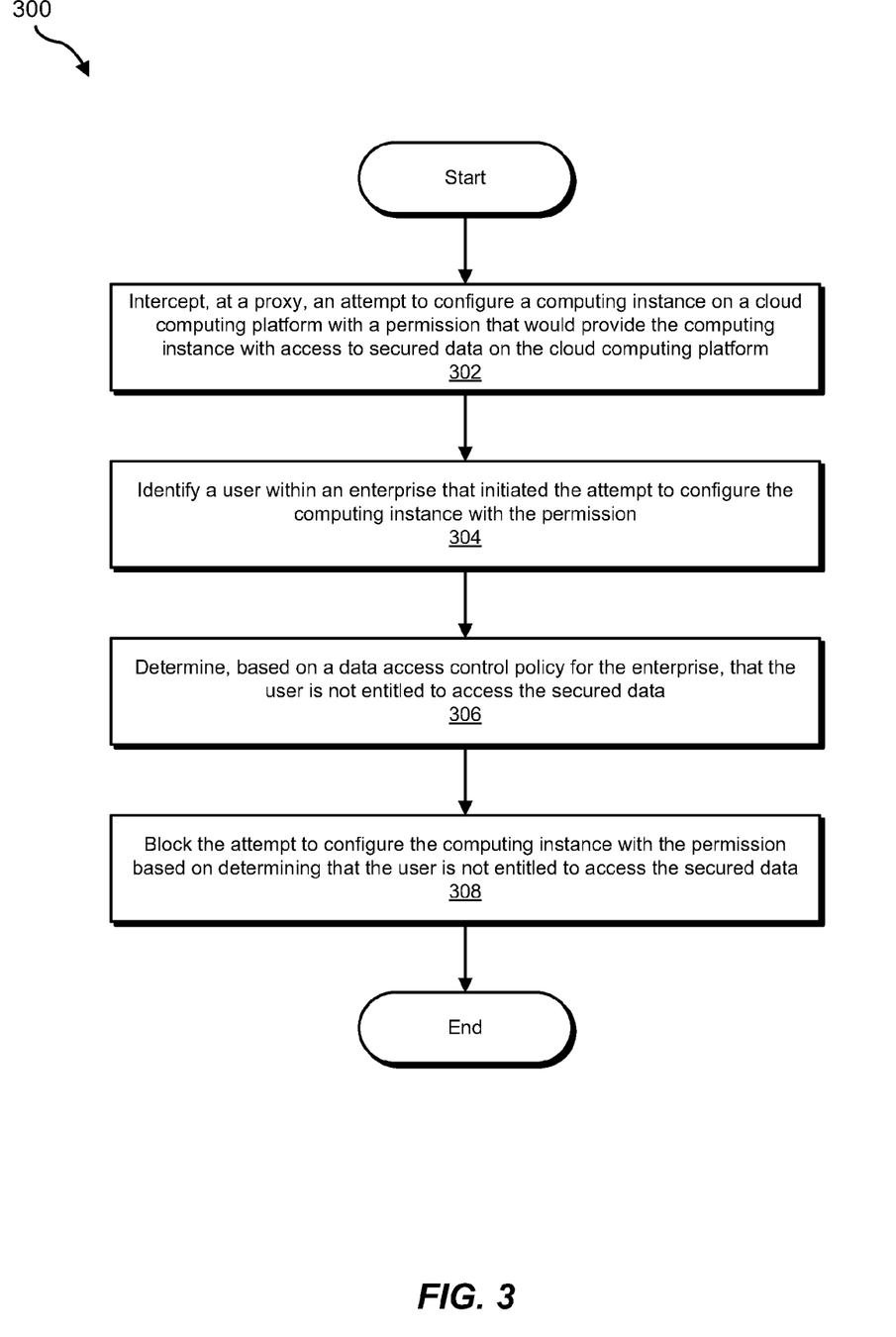
FIG. 3 is a flow diagram of an exemplary method for enforcing enterprise data access control policies in cloud computing environments.
Figure 4:
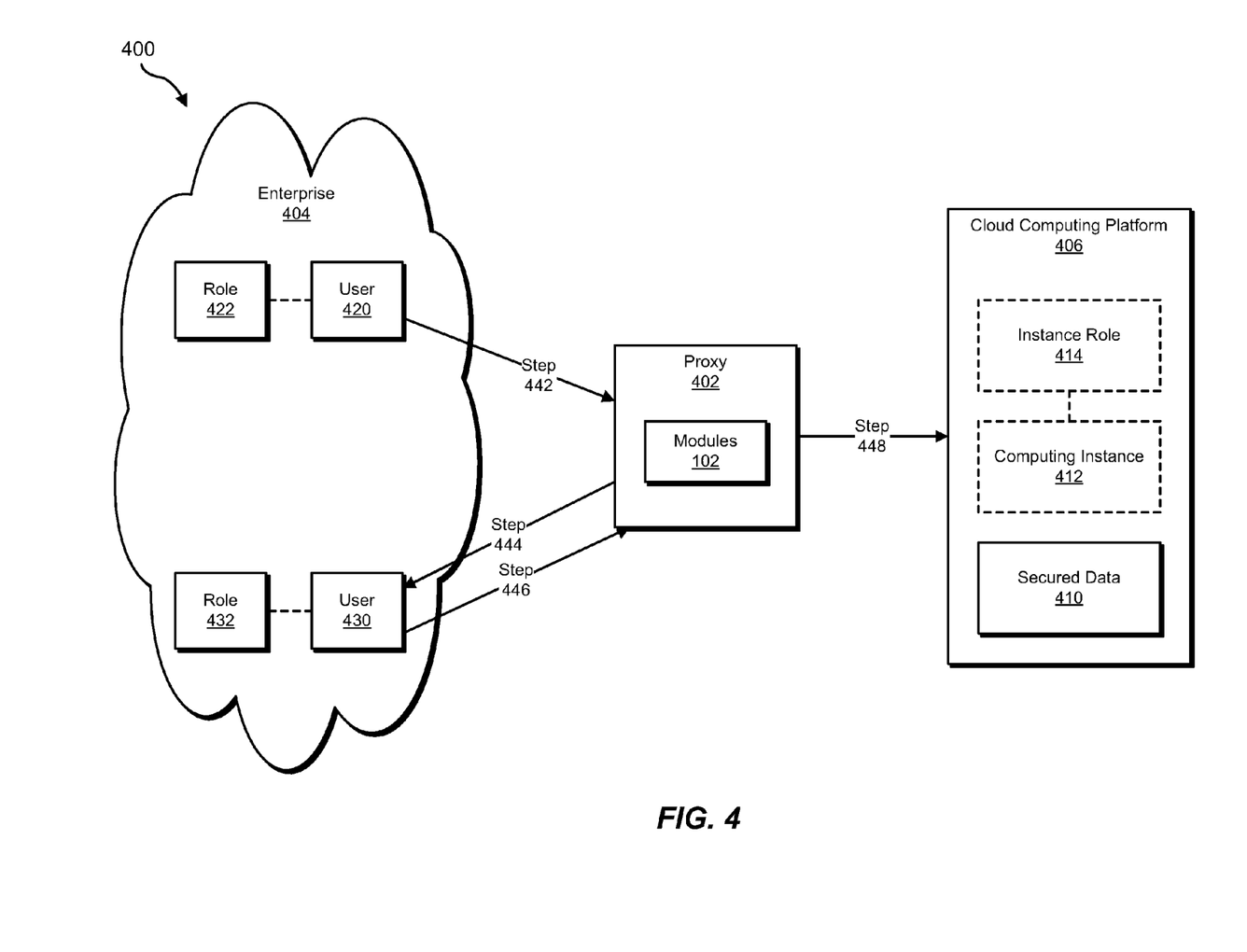
FIG. 4 is a block diagram of an exemplary system for enforcing enterprise data access control policies in cloud computing environments.

The following will provide, with reference to FIGS. 1, 2, and 4, detailed descriptions of exemplary systems for enforcing enterprise data access control policies in cloud computing environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enforcing enterprise data access control policies in cloud computing environments. As illustrated in this figure, exemplary system 100 may include one or more modules 102 for performing one or more tasks. For example, and as will be explained in greater detail below, exemplary system 100 may include an interception module 104 that may intercept, at a proxy, an attempt to configure a computing instance on a cloud computing platform with a permission that would provide the computing instance with access to secured data on the cloud computing platform. Exemplary system 100 may additionally include an identification module 106 that may identify a user within an enterprise that initiated the attempt to configure the computing instance with the permission. Exemplary system 100 may also include a determination module 108 that may determine, based on a data access control policy for the enterprise, that the user may be not entitled to access the secured data. Exemplary system 100 may additionally include a blocking module 110 that may block the attempt to configure the computing instance with the permission based on determining that the user may be not entitled to access the secured data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., proxy 202, cloud computing platform 206, and/or enterprise 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a data access control policy 122 that specifies one or more roles, permissions, and/or rules regarding datasets and/or types of data that a user may access, control, and/or enable a computing instance on a cloud computing platform to access.

Database 120 may represent portions of a single database or computing device or a plurality of databases or computing devices. For example, database 120 may represent a portion of cloud computing platform 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as cloud computing platform 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a proxy 202 in communication with a cloud computing platform 206 via a network 204. In one example, proxy 202 may be programmed with one or more of modules 102 and/or may store all or a portion of the data in database 120. Additionally or alternatively, cloud computing platform 206 may be programmed with one or more of modules 102 and/or may store all or a portion of the data in database 120.

In one embodiment, one or more of modules 102 from FIG. 1 may, when executed by at least one processor of proxy 202 and/or cloud computing platform 206, enable proxy 202 and/or cloud computing platform 206 to enforce enterprise data access control policies in cloud computing environments. For example, and as will be described in greater detail below, an enterprise 208 may use cloud computing platform 206 to run one or more computing instances and/or to store secured data. In one example, and as will be described in greater detail below, interception module 104 may intercept, at a proxy, an attempt 222 to configure a computing instance 212 on cloud computing platform 206 with a permission 226 that would provide computing instance 212 with access to secured data 210 on the cloud computing platform. Identification module 106 may then identify a user 224 within enterprise 208 that initiated attempt 222 to configure computing instance 212 with permission 226. Determination module 108 may then determine, based on data access control policy 122 for enterprise 208, that user 224 is not entitled to access secured data 210. Finally, blocking module 110 may block attempt 222 to configure computing instance 212 with permission 226 based on determining that user 224 is not entitled to access secured data 210.

Proxy 202 generally represents any type or form of computing device capable of reading computer-executable instructions. Examples of proxy 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Cloud computing platform 206 generally represents any type or form of computing device and/or collection of computing devices capable of reading computer-executable instructions. Examples of cloud computing platform 206 include, without limitation, application servers and database servers configured to provide various database services and/or run certain software applications. Cloud computing platform 206 may represent portions of a single computing device or a plurality of computing devices. For example, cloud computing platform 206 may represent a portion of computing system 510 in FIG. 5 and/or portions of exemplary network architecture 600 in FIG. 6. Additionally or alternatively, cloud computing platform 206 may represent one or more physically separate devices capable of being accessed by a computing device, such as computing system 510 in FIG. 5 and/or portions of exemplary network architecture 600 in FIG. 6.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between proxy 202 and cloud computing platform 206.

FIG. 3 is a flow diagram of an exemplary computer-implemented method 300 for enforcing enterprise data access control policies in cloud computing environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may intercept, at a proxy, an attempt to configure a computing instance on a cloud computing platform with a permission that would provide the computing instance with access to secured data on the cloud computing platform. For example, at step 302 interception module 104 may, as part of proxy 202 in FIG. 2, intercept, at a proxy, attempt 222 to configure computing instance 212 on cloud computing platform 206 with permission 226 that would provide computing instance 212 with access to secured data 210 on cloud computing platform 206.

The term "proxy," as used herein, may refer to any computing system that acts as an intermediary between at least two other computing systems and/or networks. For example, a proxy may act as an intermediary between an enterprise and a cloud computing platform. In one embodiment, interception module 104 may be hosted on a proxy server which acts as an intermediary between the enterprise and the cloud computing platform. In this example, management traffic (including, e.g., attempts to launch and/or configure computing instances with specified permissions and/or roles to access secured data stored on the cloud computing platform) directed to the cloud computing platform from the enterprise may be required to pass through the proxy.

As used herein, the phrase "computing instance" may refer to any unit of computational resources that may be provided by a cloud computing platform and that may store and/or access data stored on the cloud computing platform. In some examples, the phrase "computing instance" may correspond to a virtual machine provisioned within the cloud computing service (e.g., onto which a user may install one or more applications that may store data on the cloud computing platform). As used herein, the phrase "virtual machine" generally refers to any operating system environment that is abstracted from computing hardware by a virtual machine manager (e.g., a hypervisor). Examples of computing instances include, without limitation, AMAZON ELASTIC COMPUTE CLOUD ("EC2") instances and VMWARE VCENTER virtual machines.

As used herein, the phrase "cloud computing platform" may refer to any service, platform, and/or infrastructure that is capable of providing online and/or third-party hosting for applications and/or storage. Examples of cloud computing platforms include, without limitation, Platform-as-a-Service ("PaaS") systems, Software-as-a-Service ("SaaS") systems, and Infrastructure-as-a-Service ("IaaS") systems. In some examples, a cloud computing platform may provide third-party storage (e.g., including, e.g., secured storage) as well as the ability to launch computing instances that may access stored data. In some examples, a cloud computing platform may allow an enterprise to specify roles for accessing specified datasets. The cloud computing platform may enable an enterprise to launch computing instances with selected roles to enable the computing instances to access corresponding datasets. Examples of cloud computing services may include, without limitation, AMAZON WEB SERVICES ("AWS") (with, e.g., AMAZON S3 and/or AMAZON RDS as storage services) and VMWARE VSPHERE.

The term "permission," as used herein, generally refers to any rule and/or criterion for determining access to a resource. In some examples, the permission may include a role assignable to computing instances by the cloud computing platform. For example, the cloud computing platform may allow computing instances assigned with a given role to access resources (e.g., storage instances) pertaining to the role. In some examples, the cloud computing platform may maintain credentials required for accessing resources and invoke the credentials on behalf of computing instances with the appropriate roles. For example, the cloud computing platform may allow an organization to assign one or more computing instances a "financial" role. The organization may associate the "financial" role with one or more datasets stored and/or accessible by the cloud computing platform, including, e.g., a dataset that stores credit card information. Accordingly, by configuring a computing instance with the "financial" role, an administrator may configure the computing instance with a permission to access the dataset that stores the credit card information.

Interception module 104 may intercept the attempt in any of a variety of contexts. For example, interception module 104 may intercept the attempt on a proxy system configured to intercept network traffic leaving a computing environment that includes an administration system for the cloud computing platform. The administration system may include any system for launching and/or configuring computing instances and/or remotely initiating the launching and/or configuration of computing instances on the cloud computing platform. The computing environment may include any of a variety of computing configurations. For example, the computing environment may include an enterprise network (e.g., connected to a wide area network by a router and/or gateway, with the wide area network connecting the enterprise network to the cloud computing platform). Additionally or alternatively, the computing environment may include one or more computing devices under the control of a subscriber to the cloud computing platform.

FIG. 4 illustrates an exemplary system 400 and may provide an example of interception module 104 intercepting the attempt to configure the computing instance. As shown in FIG. 4, system 400 may include a proxy 402 configured with modules 102 and situated between an enterprise 404 and a cloud computing platform 406. Using FIG. 4 as an example, a user 420 within enterprise 404 may attempt to configure a computing instance 412 on cloud computing platform 406 with an instance role 414 (e.g., which would provide computing instance 412 with access to secured data 410). At step 442, proxy 402 may intercept the attempt. As will be explained in greater detail below, one or more of modules 102 on proxy 402 may analyze the attempt before determining whether to forward the attempt to cloud computing platform 406 or to block the attempt.

Returning to FIG. 3, at step 304 one or more of the systems described herein may identify a user within an enterprise that initiated the attempt to configure the computing instance with the permission. For example, at step 304 identification module 106 may, as part of proxy 202 in FIG. 2, identify user 224 within enterprise 208 that initiated attempt 222 to configure computing instance 212 with permission 226.

The term "enterprise," as used herein, generally refers to any organization and/or computing environment maintained and/or controlled by an organization (e.g., a computing network). For example, an enterprise may include a networked computing environment controlled by an organization and operated by multiple administrators. In some examples, the organization may use a cloud computing platform to store data and/or execute computing instances. The administrators of the organization may, accordingly, configure and/or launch computing instances on behalf of the organization. In some examples, the administrators may have different roles within the organization, and, therefore, may have different responsibilities and different access privileges to data controlled by the organization (e.g., both data stored within the enterprise and stored on the cloud computing platform). As will be explained in greater detail below, the systems described herein may help to ensure that each administrator may only launch and/or configure computing instances on the cloud computing platform with permissions to access data that is under the purview of that administrator.

The term "user," as used herein, generally refers to any user, user account, and/or administrator within an enterprise. In some examples, the term "user" may refer to an account that an enterprise administrator has with a cloud computing platform that enables the administrator to access the cloud computing platform on behalf of the enterprise. In some examples, the user may be entitled to configure the computing instance on the cloud computing platform without the permission. For example, the cloud computing platform may allow the user to launch computing instances for the enterprise on the cloud computing platform (e.g., because an enterprise has provided the administrator with access to an account tied to the enterprise on the cloud computing platform). Additionally, the cloud computing platform may be configured to allow the user to configure and launch computing instances with the permission, although the user may not be allowed to access data corresponding to the permission according to enterprise policies.

Identification module 106 may identify the user within the enterprise that initiated the attempt to configure the computing instance in any of a variety of ways. For example, identification module 106 may identify the user by extracting, at the proxy, an identifier of the user from the attempt to configure the computing instance. For example, the attempt may include information identifying the user to the cloud computing platform and identification module 106 may extract the information identifying the user from the attempt. Additionally or alternatively, identification module 106 may identify an origin of the attempt from within the enterprise and determine the identity of the user based on the origin of the attempt. Using FIG. 4 as an example, identification module 106 may, as a part of proxy 402, identify user 420 as having initiated the attempt to configure computing instance 412 on cloud computing platform 406.

Returning to FIG. 3, at step 306 one or more of the systems described herein may determine, based on a data access control policy for the enterprise, that the user is not entitled to access the secured data. For example, at step 306 determination module 108 may, as part of proxy 202 in FIG. 2, determine, based on data access control policy 122 for the enterprise, that user 224 is not entitled to access secured data 210.

The phrase "data access control policy," as used herein, may refer to any information indicating what type of data a user and/or administrator is allowed to access, control, and/or enable a computing instance on a cloud computing platform to access. In some examples, the data access control policy may include information indicating a role of the user and/or administrator within an enterprise and/or one or more data classifications describing data that the user and/or administrator is allowed to access (e.g., within an enterprise).

Determination module 108 may identify the data access control policy in any of a variety of ways. For example, determination module 108 may retrieve, at the proxy, the data access control policy from the enterprise. In some examples, determination module 108 may store the data access control policy at the proxy. In one example, determination module 108 may enable a security administrator to define the data access control policy for the user (and, e.g., for other users that may attempt to configure computing instances on the cloud computing platform from and/or on behalf of the enterprise).

In some examples, determination module 108 may extract, at the proxy, an identifier of the permission from the attempt to configure the computing instance. In addition, in some examples, determination module 108 may access information describing data that is accessible via the permission. For example, determination module 108 may request classification information relating to the data from the cloud computing platform (e.g., via an application programming interface). Additionally or alternatively, determination module 108 may receive classification information relating to the data from a data loss prevention system. In this example, the data loss prevention system (and/or determination module 108 acting as a part of a data loss prevention system) may monitor, scan, analyze, and/or parse the data that is accessible via the permission and classify the data (e.g., based on one or more keywords and/or regular expressions found within the data). For example, the data loss prevention system may determine a sensitivity level of the data that is accessible via the permission and/or compliance policies invoked by the data. Examples of such compliance policies may include policies for ensuring compliance with the Payment Card Industry Data Security Standard ("PCI DSS"), the Health Insurance Portability and Accountability Act ("HIPAA"), and the like.

In some examples, determination module 108 identify classification information derived from analyzing user activity in connection with the data that is accessible via the permission. For example, determination module 108 may determine which users access the data and how frequently they access the data to determine which users have legitimate access to the data.

Determination module 108 may determine that the user is not entitled to access the secured data in any of a variety of ways. For example, determination module 108 may determine that the data access control policy restricts the user's access to data of the type made accessible by the permission.

In one example, determination module 108 may determine that the user is not entitled to access the secured data by (1) identifying a cloud-side role that is defined on the cloud computing platform as having access to the permission, (2) identifying an enterprise-side role pertaining to the user, (3) identifying a role map that maps enterprise-side roles to cloud-side roles, and (4) determining, based on the role map, that the enterprise-side role is not map to the cloud-side role. For example, determination module 108 may determine that the attempt to configure the computing instance includes provisioning the computing instance with a cloud-side role of "medical data application." Determination module 108 may also identify an enterprise-side role that defines the role of the user in an enterprise as "financial data administrator." Determination module 108 may then consult a role may that maps the enterprise-side role "financial data administrator" with the cloud-side role "financial data application" and the enterprise-side role "medical data administrator" with the cloud-side role "medical data application." Because "financial data administrator" does not map to "medical data application," determination module 108 may determine that the user is not entitled to access the secured data.

Using FIG. 4 as an example, determination module 108 may, as a part of proxy 402, determine that user 420 is not allowed to configure the computing instance 412 with instance role 414 on cloud computing platform 406 based on a role 422 of user 420 within enterprise 404 not entitling user 420 to access secured data 410.

Returning to FIG. 3, at step 308 one or more of the systems described herein may block the attempt to configure the computing instance with the permission based on determining that the user is not entitled to access the secured data. For example, at step 308 blocking module 110 may, as part of proxy 202 in FIG. 2, block attempt 222 to configure computing instance 212 with permission 226 based on determining that user 224 is not entitled to access secured data 210.

Blocking module 110 may block the attempt to configure the computing instance in any suitable manner. For example, blocking module 110 may simply not forward the attempt along to the cloud computing platform. In some examples, blocking module 110 may block the attempt by modifying the attempt and forwarding the modified instruction to the cloud computing platform (e.g., to configure the computing instance, but without the permission). In some examples, blocking module 110 may return a message advising the user that the attempt has been blocked. Additionally or alternatively, blocking module 110 may alert a security administrator that the attempt has been blocked (and, e.g., identifying the user and/or the permission).

In one example, blocking module 110 may (1) identify, subsequent to blocking the attempt, an additional user within the enterprise that is entitled to access the secured data, (2) initiate a request to the additional user to approve the attempt to configure the computing instance with the permission that would provide the computing instance with access to secured data on the cloud computing platform, (3) receive, in response to the request, approval from the additional user to configure the computing instance with the permission, and (4) forward the attempt to configure the computing instance to the cloud computing platform. In this manner, the attempt may ultimately result in configuring the computing instance on the cloud computing platform.

Using FIG. 4 as an example, blocking module 110 may block the attempt by user 420 to configure computing instance 412 with instance role 414 on cloud computing platform 406. Blocking module 110 may then, at step 444, send a request to a user 430 within enterprise 404 to approve the attempt (e.g., because user 430 has a role 432 within enterprise 404 that gives user 430 access to data such as secured data 410). At step 446, user 430 may approve the attempt. Accordingly, at step 448, proxy 402 may forward the attempt to cloud computing platform 406, which may then configure computing instance 412 with instance role 414, giving computing instance 412 access to secured data 410.

In one example, the systems described herein may (1) intercept, at the proxy, an additional attempt to configure an additional computing instance on the cloud computing platform with the permission, (2) identify an additional user within the enterprise that initiated the additional attempt to configure the additional computing instance, (3) determine, based on the data access control policy for the enterprise, that the additional user is entitled to access the secured data, and (4) allow the attempt to configure the additional computing instance with the permission based on determining that the additional user is entitled to access the secured data. In this manner, the systems described herein may selectively allow users within an enterprise to configure computing instances with permissions.

As explained above in connection with method 300 in FIG. 3, by determining whether to allow or block attempts by users within an enterprise to configure computing instances on the cloud computing platform by examining permissions to be granted to the computing instances, which users are attempting to provision the computing instances with the permissions, and the roles of the users in the enterprise, the systems and methods described herein may allow an enterprise to ensure that administrators do not access and/or control cloud-stored data outside the scope of their roles in the enterprise. Furthermore, by intercepting and inspecting management traffic into a cloud computing platform at a network proxy, these systems and methods may enable an enterprise to achieve the above with a variety of cloud computing platforms and without requiring changes to the cloud computing platforms (which, e.g., may be out of the control of an organization wishing to manage permissions in a cloud computing context).

For example, applications running in cloud computing instances (e.g., EC2 instances) on a cloud computing platform (e.g., AWS) may be provisioned with credentials with access to cloud storage services. A policy broker may inspect all management traffic into the cloud computing platform through a network proxy. The policy broker may extract identity and access management ("IAM") roles out of AWS. The policy broker may also acquire classifications of data in cloud data services such as AMAZON S3. The policy broker may acquire these classifications from the cloud computing platform, from data loss prevention systems, and/or from unstructured data governance systems (e.g., SYMANTEC DATA INSIGHT). The policy broker may also use enterprise role information that describes which application administrators have access to data belonging to what data classifications. The policy broker may allow security administrators to define rules regarding which application administrators may launch cloud computing instances with which IAM roles to access which classes of data.

Figure 5:
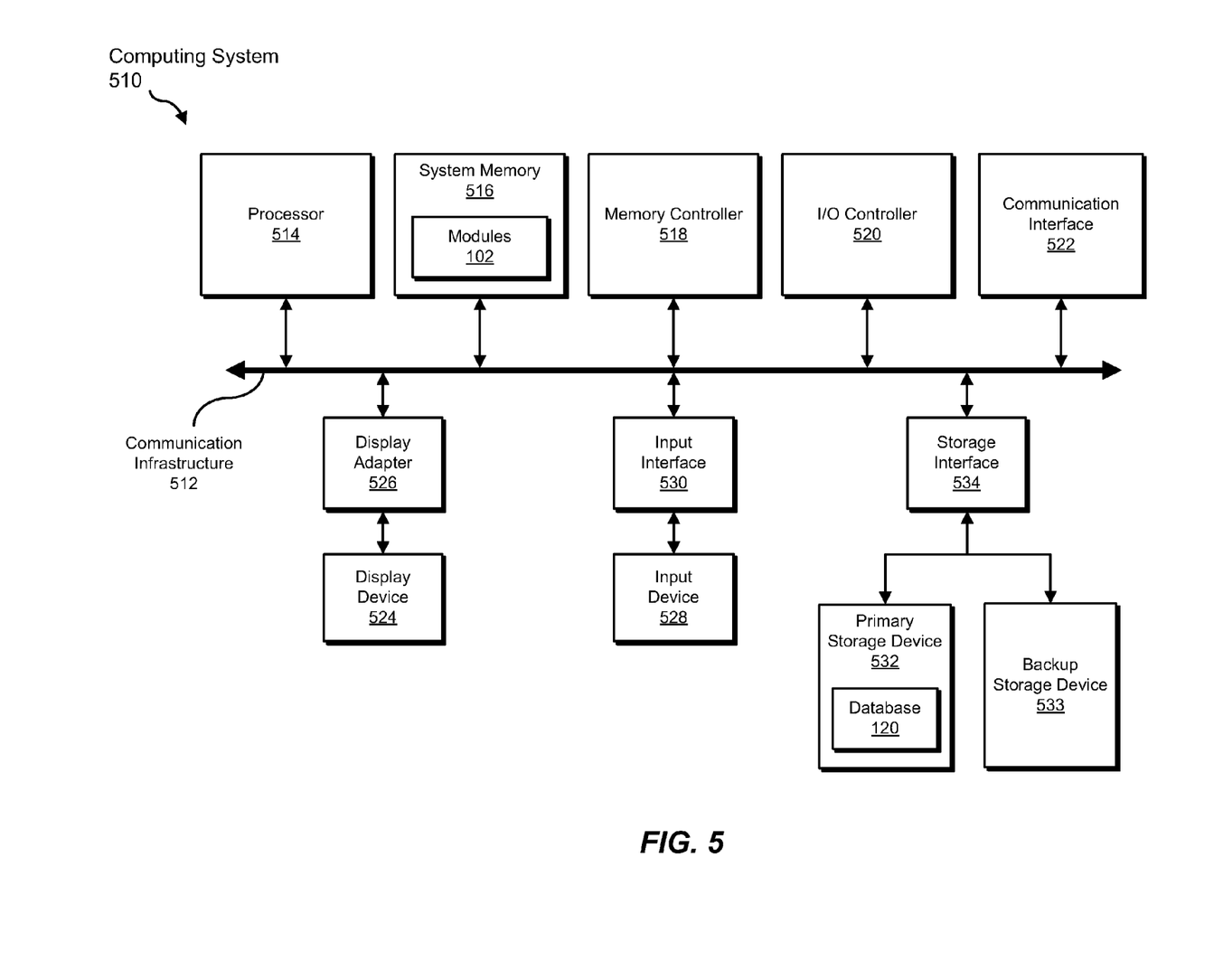
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
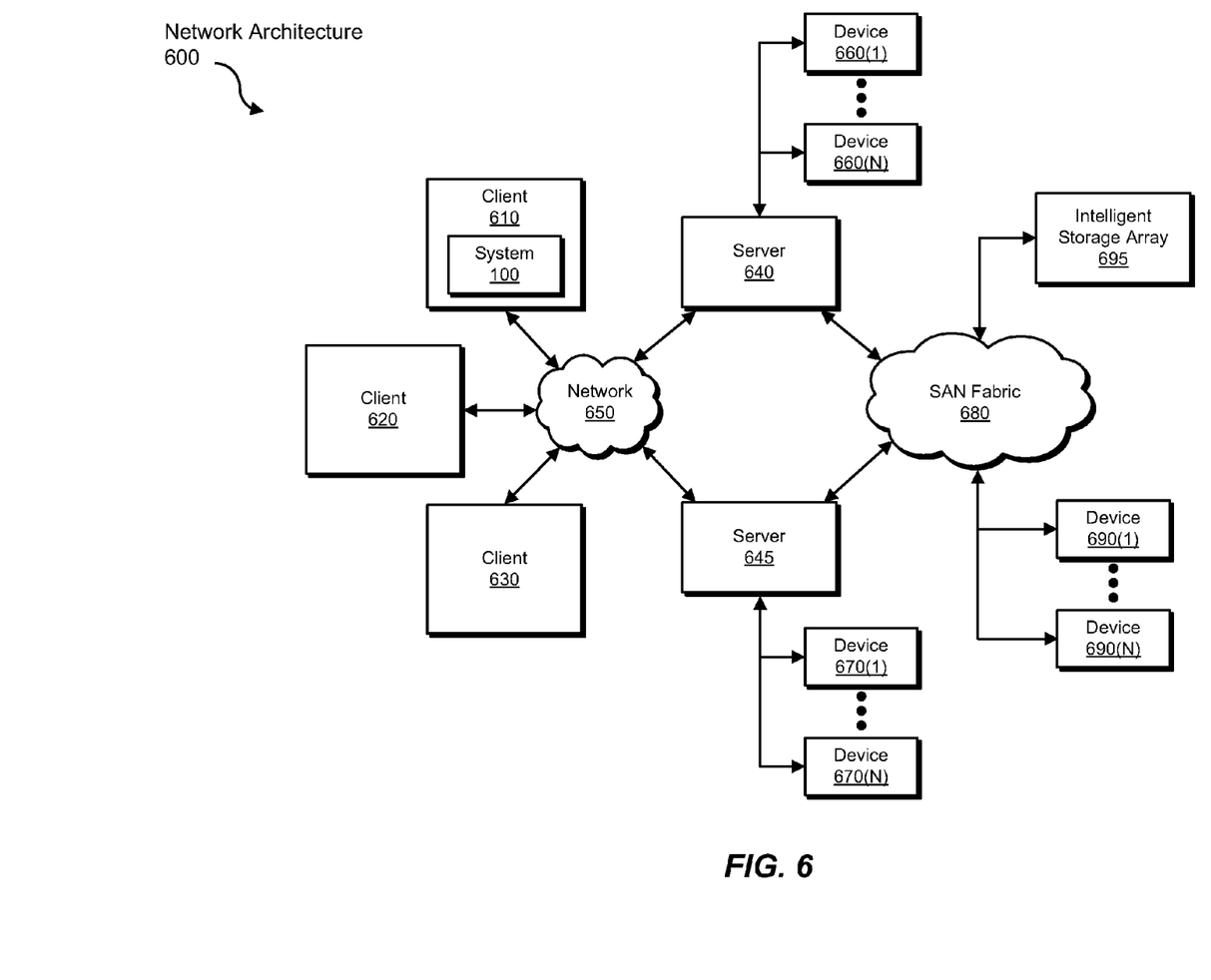
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for enforcing enterprise data access control policies in cloud computing environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive cloud computing platform management traffic to be transformed, transform the management traffic, output a result of the transformation to a cloud computing platform, use the result of the transformation to determine the validity of computing instance configurations by given users, and store the result of the transformation to the cloud computing platform. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing enterprise data access control policies in cloud computing environments, at least a portion of the method being performed by a computing device comprising at least one processor, the method comprising:

intercepting, at a proxy, an attempt to configure a computing instance that provides virtualized access to computing resources on a cloud computing platform and that provides third-party processing for an enterprise with a permission that would provide the computing instance with access to secured data on the cloud computing platform;

identifying, at the proxy, a user within the enterprise that initiated the attempt to configure the computing instance with the permission;

determining, at the proxy, based on a data access control policy for the enterprise, that the user is not entitled to access the secured data;

blocking, at the proxy, the attempt to configure the computing instance with the permission based on determining that the user is not entitled to access the secured data;

identifying, subsequent to blocking the attempt, an entitled user within the enterprise that is entitled to access the secured data;

initiating a request to the entitled user to approve the attempt to configure the computing instance with the permission that would provide the computing instance with access to secured data on the cloud computing platform;

receiving, in response to the request, approval from the entitled user to configure the computing instance with the permission;

forwarding the attempt to configure the computing instance to the cloud computing platform.

2. The computer-implemented method of claim 1, further comprising retrieving, at the proxy, the data access control policy from the enterprise.

3. The computer-implemented method of claim 1, wherein identifying the user within the enterprise that initiated the attempt to configure the computing instance with the permission comprises extracting, at the proxy, an identifier of the user from the attempt to configure the computing instance.

4. The computer-implemented method of claim 1, wherein determining that the user is not entitled to access the secured data comprises extracting, at the proxy, an identifier of the permission from the attempt to configure the computing instance.

5. The computer-implemented method of claim 1, wherein the user is entitled to configure the computing instance on the cloud computing platform without the permission.

6. The computer-implemented method of claim 1, further comprising:
   intercepting, at the proxy, an additional attempt to configure an additional computing instance on the cloud computing platform with the permission;
   identifying an additional user within the enterprise that initiated the additional attempt to configure the additional computing instance;
   determining, based on the data access control policy for the enterprise, that the additional user is entitled to access the secured data;
   allowing the attempt to configure the additional computing instance with the permission based on determining that the additional user is entitled to access the secured data.

7. The computer-implemented method of claim 1, wherein determining, based on the data access control policy for the enterprise, that the user is not entitled to access the secured data comprises:
   identifying a cloud-side role that is defined on the cloud computing platform as having access to the permission;
   identifying an enterprise-side role pertaining to the user;
   identifying a role map that maps enterprise-side roles to cloud-side roles;
   determining, based on the role map, that the enterprise-side role is not mapped to the cloud-side role.

8. A system for enforcing enterprise data access control policies in cloud computing environments, the system comprising:
   an interception module, stored in memory, that intercepts, at a proxy, an attempt to configure a computing instance that provides virtualized access to computing resources on a cloud computing platform and that provides third-party processing for an enterprise with a permission that would provide the computing instance with access to secured data on the cloud computing platform;
   an identification module, stored in memory, that identifies, at the proxy, a user within the enterprise that initiated the attempt to configure the computing instance with the permission;
   a determination module, stored in memory, that determines, at the proxy, based on a data access control policy for the enterprise, that the user is not entitled to access the secured data;
   a blocking module, stored in memory, that:
      blocks, at the proxy, the attempt to configure the computing instance with the permission based on determining that the user is not entitled to access the secured data;
      identifies, subsequent to blocking the attempt, an entitled user within the enterprise that is entitled to access the secured data;
      initiates a request to the entitled user to approve the attempt to configure the computing instance with the permission that would provide the computing instance with access to secured data on the cloud computing platform;
      receives, in response to the request, approval from the entitled user to configure the computing instance with the permission;
      forwards the attempt to configure the computing instance to the cloud computing platform;
   at least one physical processor that executes the interception module, the identification module, the determination module, and the blocking module.

9. The system of claim 8, further comprising a retrieving module that retrieves, at the proxy, the data access control policy from the enterprise.

10. The system of claim 8, wherein the identification module identifies the user within the enterprise that initiated the attempt to configure the computing instance with the permission by extracting, at the proxy, an identifier of the user from the attempt to configure the computing instance.

11. The system of claim 8, wherein the determination module determines that the user is not entitled to access the secured data by extracting, at the proxy, an identifier of the permission from the attempt to configure the computing instance.

12. The system of claim 8, wherein the user is entitled to configure the computing instance on the cloud computing platform without the permission.

13. The system of claim 8, wherein:
   the interception module further intercepts, at the proxy, an additional attempt to configure an additional computing instance on the cloud computing platform with the permission;
   the identification module further identifies an additional user within the enterprise that initiated the additional attempt to configure the additional computing instance;
   the determination module further determines, based on the data access control policy for the enterprise, that the additional user is entitled to access the secured data;
   the blocking module further allows the attempt to configure the additional computing instance with the permission based on determining that the additional user is entitled to access the secured data.

14. The system of claim 8, wherein the determination module determines, based on the data access control policy for the enterprise, that the user is not entitled to access the secured data by:
   identifying a cloud-side role that is defined on the cloud computing platform as having access to the permission;
   identifying an enterprise-side role pertaining to the user;
   identifying a role map that maps enterprise-side roles to cloud-side roles;
   determining, based on the role map, that the enterprise-side role is not mapped to the cloud-side role.

15. A non-transitory computer-readable medium comprising one or more computer-readable instructions that, when executed by at least one processor of a computing device, cause the computing device to:
   intercept, at a proxy, an attempt to configure a computing instance that provides virtualized access to computing resources on a cloud computing platform and that provides third-party processing for an enterprise with a permission that would provide the computing instance with access to secured data on the cloud computing platform;

identify, at the proxy, a user within the enterprise that initiated the attempt to configure the computing instance with the permission;

determine, at the proxy, based on a data access control policy for the enterprise, that the user is not entitled to access the secured data;

block, at the proxy, the attempt to configure the computing instance with the permission based on determining that the user is not entitled to access the secured data;

identify, subsequent to blocking the attempt, an entitled user within the enterprise that is entitled to access the secured data;

initiate a request to the entitled user to approve the attempt to configure the computing instance with the permission that would provide the computing instance with access to secured data on the cloud computing platform;

receive, in response to the request, approval from the entitled user to configure the computing instance with the permission;

forward the attempt to configure the computing instance to the cloud computing platform.

16. The non-transitory computer-readable medium of claim 15, wherein the one or more computer-readable instructions further cause the computing device to retrieve, at the proxy, the data access control policy from the enterprise.

17. The non-transitory computer-readable medium of claim 15, wherein the one or more computer-readable instructions cause the computing device to identify the user within the enterprise that initiated the attempt to configure the computing instance with the permission by extracting, at the proxy, an identifier of the user from the attempt to configure the computing instance.

18. The non-transitory computer-readable medium of claim 15, wherein the one or more computer-readable instructions cause the computing device to determine that the user is not entitled to access the secured data by extracting, at the proxy, an identifier of the permission from the attempt to configure the computing instance.

* * * * *